US007415130B1

(12) United States Patent
Rundle et al.

(10) Patent No.: US 7,415,130 B1
(45) Date of Patent: Aug. 19, 2008

(54) MAIL IMAGE PROFILING AND HANDWRITING MATCHING

(75) Inventors: Alfred T. Rundle, Endwell, NY (US); Lennart A. Saaf, Endicott, NY (US); Richard C. Vanhall, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 729 days.

(21) Appl. No.: 10/697,533

(22) Filed: Oct. 30, 2003

Related U.S. Application Data

(60) Provisional application No. 60/422,311, filed on Oct. 30, 2002.

(51) Int. Cl.
*G06K 9/00* (2006.01)
*B07C 5/00* (2006.01)
(52) U.S. Cl. .................. 382/101; 382/101; 209/584
(58) Field of Classification Search .................. 382/101, 382/102; 209/584
See application file for complete search history.

(56) References Cited

U.S. PATENT DOCUMENTS

| 5,142,482 | A | * | 8/1992 | Sansone ...................... 700/221 |
| 5,288,994 | A | | 2/1994 | Berson .................... 250/223 R |
| 5,490,225 | A | | 2/1996 | Kumagai .................... 382/227 |
| 5,515,455 | A | * | 5/1996 | Govindaraju et al. ....... 382/186 |
| 5,642,228 | A | | 6/1997 | Takezawa et al. ........... 359/642 |
| 6,025,931 | A | * | 2/2000 | Bloomfield ................. 358/402 |
| 6,160,994 | A | | 12/2000 | Wiedeman ................. 455/12.1 |
| 6,246,794 | B1 | * | 6/2001 | Kagehiro et al. ............ 382/185 |
| 6,269,171 | B1 | | 7/2001 | Gozzo et al. ................. 382/101 |

(Continued)

FOREIGN PATENT DOCUMENTS

JP    2003085301 A  *  3/2003

OTHER PUBLICATIONS

S. N. Srihari, "Handwriting Identification: Research to Study Validity of Individuality of Handwriting & Develop Computer-Assisted Procedures of Comparing Handwriting." Interim Technical Report, prepared for National Institute of Justice, Sep. 9, 2000.

(Continued)

*Primary Examiner*—Jingge Wu
*Assistant Examiner*—Bernard Krasnic
(74) *Attorney, Agent, or Firm*—Burns & Levinson, LLP; Jacob N. Erlich, Esq.; Kathleen Chapman, Esq.

(57) ABSTRACT

Method and systems for early detection of potentially hazardous material associated with the collection of mail or other objects. In an embodiment of the method of this invention, image characteristics for an image of an item being examined are obtained. A predetermined profile is then retrieved from a profile database. The image characteristics for the image of the item are compared to the image characteristics present in the predetermined profile. If the image characteristics present in the predetermined profile substantially match the image characteristics for the image of the item, the item is identified for special processing. If the image characteristics present in the predetermined profile do not substantially match the image characteristics for the image of the item, another predetermined profile is retrieved and compared to the image characteristics for the image of the item. A system that implements the method of this invention includes a transport sub-system and a computing sub-system.

27 Claims, 6 Drawing Sheets

U.S. PATENT DOCUMENTS

| | | | |
|---|---|---|---|
| 6,292,709 B1 * | 9/2001 | Uhl et al. | 700/226 |
| 6,311,892 B1 | 11/2001 | O'Callaghan et al. | 235/375 |
| 6,567,008 B1 * | 5/2003 | Sansone | 340/666 |
| 6,778,683 B1 * | 8/2004 | Bonner et al. | 382/101 |
| 7,024,019 B2 * | 4/2006 | Sansone | 382/101 |
| 7,071,437 B2 * | 7/2006 | Ryan et al. | 209/584 |
| 2002/0001029 A1 | 1/2002 | Abe | 348/49 |
| 2002/0029202 A1 * | 3/2002 | Lopez | 705/406 |
| 2002/0141613 A1 * | 10/2002 | Sansone | 382/101 |
| 2003/0121839 A1 * | 7/2003 | Ryan et al. | 209/589 |

OTHER PUBLICATIONS

U.S. Appl. No. 60/422,311, filed Oct. 30, 2002 for Alfred T. Rundle et al., Title: Mail Image Profiling and Handwriting Matching.

S. N. Srihari and S. Lee, *Automatic Handwriting recognition and Writer Matching on Anthrax-related Handwritten Mail*, Proc. of the 8th Int'l Workshop on Frontiers in Handwriting Recognition, 2002.

J. Terry, S. Kamigaki and T. Vazulina. (2000). Recognizing the Truth About Character Recognition. Available at http://www.parascript.com/products/whitepapers.cfm.

* cited by examiner

MAIL IMAGE PROFILING AND HANDWRITING MATCHING

CROSS REFERENCE TO RELATED APPLICATIONS

This application claims priority of U.S. Provisional Application 60/422,311 filed on Oct. 30, 2002, which is herein incorporated by reference.

BACKGROUND OF THE INVENTION

This invention relates generally to the detection of hazardous material and, more particularly, to the application of image processing to early detection of potentially hazardous material associated with mail collection or the collection of other objects.

Recently there has been increased awareness of the potential for large-scale introduction of hazardous materials, for example, biological organisms, to create chaos or to harm an intended set of victims. One potential delivery method that terrorists or other criminals utilize to deliver such hazardous materials is through the mail or other form of a delivery. In so doing, not only is damage incurred by the intended victims, but also by any set of potential victims that may be in a position of handling such objects as the mail during the delivery or distribution process.

There is currently technology available to law enforcement organizations for detecting the presence of chemical and biological threats. Such test materials generally are sensitive to specific hazardous materials and are utilized by directly putting them in contact with such hazardous materials. To date, however, there is a lack of early detection of such hazardous material especially during the early phases of mail handling or processing. Systems in place today do not deal with detection prior to entering into the formal distribution process. Thus, throughout the distribution process potential non-intended victims are being subjected to hazardous material carried by, for example, letter or package mail.

While complete inspection would be costly, early detection, which allows suspected items to be culled from the processing stream and be fully inspected, is desirable. There is a need for automated technology to help identify mail pieces with threat-consistent characteristics for early detection. Once the candidate mail pieces have been identified as potentially harmful, the analysis, inspection, and neutralization efforts could be focused on a manageable subset of the mail.

SUMMARY OF THE INVENTION

The method and systems of this invention provide the capability to help identify items based upon predetermined characteristics. The method and systems of this invention provide the capability to help identify mail pieces with threat-consistent characteristics for early detection.

In an embodiment of the method of this invention, one or more image characteristics for an image of an item being examined are obtained. A predetermined profile is then retrieved from a profile database. The one or more image characteristics for the image of the item are compared to the one or more image characteristics present in the predetermined profile. (The term "image characteristics," as used herein below refers to one or more image characteristics.) If the image characteristics present in the predetermined profile substantially match the image characteristics for the image of the item, the item is identified for special processing. If the image characteristics present in the predetermined profile do not substantially match the image characteristics for the image of the item, another predetermined profile is retrieved and compared to the image characteristics for the image of the item.

In a specific embodiment of the method of this invention, image characteristics for an image of a mail piece being examined are obtained from a Remote Computer Reader (RCR). A threat profile is then retrieved from a profiling configuration file (database). The threat profile is then compared to the image characteristics in order to determine whether the image characteristics match the threat profile. If the threat profile matches the image characteristics, the mail piece is identified for special processing. Another threat profile is then retrieved and compared to the image characteristics. If none of the threat profiles match the image characteristics, normal mail processing continues. The method described above can be executed in "Real Time" or can be executed offline (also referred to as "Archival Processing").

An embodiment of a system of this invention includes a transport sub-system and a computing sub-system. Transport sub-system includes a transport, conveyor or pinch belt, a radiation source, a detector and any optical elements necessary to produce a scanned image of mail piece utilizing the detector. Computing sub-system includes one or more processors, computer readable media (one or more memories), a network interface and a database. Computer readable media (one or more memories) has computer readable code embodied therein which causes the one or more processors to execute the method of this invention.

Another embodiment of a system of this invention includes a transport sub-system, a computing sub-system, a network, a server and a server database.

For a better understanding of the present invention, together with other and further objects thereof, reference is made to the accompanying drawings and detailed description and its scope will be pointed out in the appended claims.

DETAILED DESCRIPTION OF THE EMBODIMENTS

Method and systems that provide the capability to identify items with predetermined characteristics are described herein below. In the detailed embodiment described herein below, the method and systems described provide the capability to detect, by image analysis, combinations of characteristics consistent with threat mail, to the extent that further inspection or processing is warranted.

In order to facilitate the disclosure of detailed embodiments of this invention, the following terms and acronyms are defined herein below:

facer-canceler—Mail processing equipment that automatically faces letter-size mail in a uniform orientation and cancels the postage stamps.

(Also referred to as canceling machine, facing identification mark, postmarking stamp, roller-canceler, and tagging.) (Called Advanced Facer Canceler System (AFCS) and Mark II Facer Canceler/Edger Feeder.)

multiline optical character reader (MLOCR)—An optical character reader that reads and interprets more than one line of the delivery address on a mail piece.

Delivery Bar Code Sorter Input/Output Subsystem (DIOSS), a universal modification kit that will be installed on existing Delivery Bar Code Sorters (DBCSs) to improve the capacity, speed and accuracy in which letter mail processing equipment reads, processes and sorts mail.

PICS—ID Code Sorting system

RBCS—Remote Bar Coding System

Postal Numeric Encoding Technique (POSTNET)—The barcode system used on letter-size and flat-size mailpieces for encoding the delivery point information and ZIP+4 code information. (Also see delivery point barcode.)

PLANET—PostaL AlphaNumeric Encoding Technique facing identification mark (FIM)—A series of five or six vertical bars used by automated postal equipment to identify, orient, and separate reply mail.

REC—Remote Encoding Center

Figure 1:
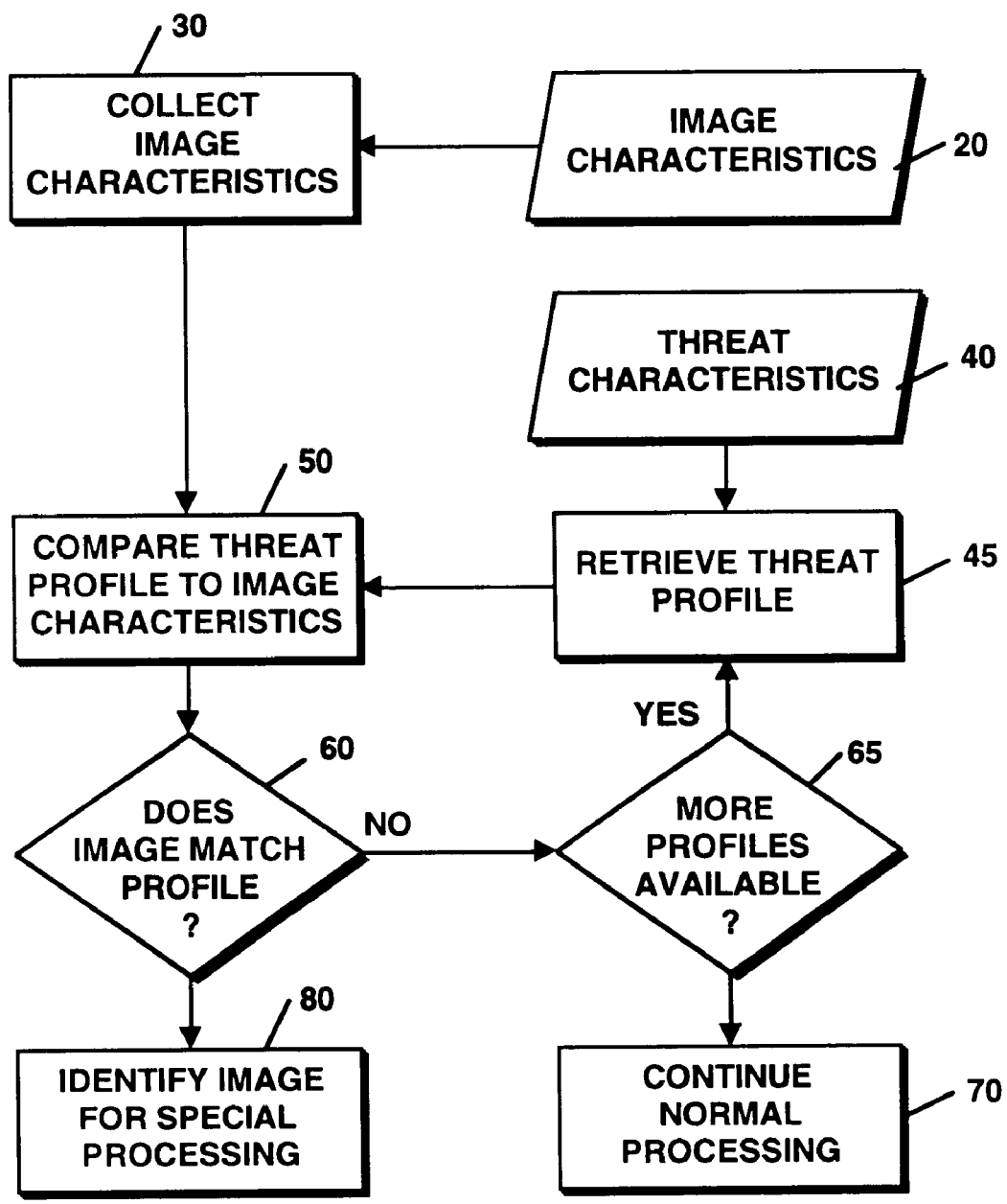
FIG. 1 depicts a flow chart of an embodiment of the method of this invention.

A flow chat of an embodiment of the method of this invention is shown in FIG. 1. Referring to FIG. 1, image characteristics 20 for a mail piece being examined are obtained (step 30, FIG. 1) from an Image reading and Processing Center (2, FIG. 3; in one embodiment, a Remote Computer Reader-RCR). The RCR (Remote Computer Reader) 2 is a key site-centralized system that processes letter mail images for the purpose of address resolution—reading address text and deriving delivery point postal (ZIP) codes. (As a central processing point for all images lifted by mail transport and scanning systems, such as AFCS, MLOCR, and DIOSS transports, RCR is a logical central source for archiving letter mail images, enabling their later retrieval for investigative purposes. (8, FIG. 3)) A threat profile 40 is then retrieved from a profiling configuration file or database (step 45, FIG. 1) in one embodiment, the threat profiles 40 are maintained in a Profiling Configuration File (5, FIG. 3) stored in the RCR system 2. The Profiling Configuration File (5, FIG. 3) can be created at and downloaded from an Image Inspection System Server (17, FIG. 3) through a network (12, FIG. 3). (The term "image characteristics," as used herein below refers to one or more image characteristics.) The threat profile 40 is then compared to the image characteristics 20 (step 50, FIG. 1) in order to determine whether the image characteristics match the threat profile (step 60, FIG. 1). If the threat profile 40 matches the image characteristics 20, the mail piece is identified for special processing (step 80, FIG. 1). ("Matching a threat profile" as used herein below can include taking account the severity of the profile. Thus, in some embodiments the image characteristics are compared to one or more profiles.) If the threat profile 40 does not match the image characteristics 20, another threat profile is then retrieved and compared to the image characteristics. If all of the threat profiles 40 do not match the image characteristics 20 (step 65, FIG. 1), normal mail processing continues (step 70, FIG. 1 and step 15, FIG. 3).

The method described above can be executed in "Real Time" or can be executed offline (also referred to as "Archival Processing"). "Real Time" Mail Image Profiling describes the capability to detect mail characteristics, determine that they fit a pre-defined threat profile, and act upon that detection decision as early as possible in the mail processing operation. Specifically, Real Time Mail Image Profiling, in one embodiment, accomplishes the profiling steps while the mail piece is undergoing processing on image collection equipment (such as MLOCR, DIOSS, or AFCS/DBCS), or, more broadly, at the originating processing facility. "Archival" (also referred to herein as offline) Mail Image Profiling refers to the process of detecting that the characteristics of a mail piece fit a defined threat profile late in, or after completion of, the mail processing cycle. A detailed description of one embodiment is given herein below.

Figure 2:
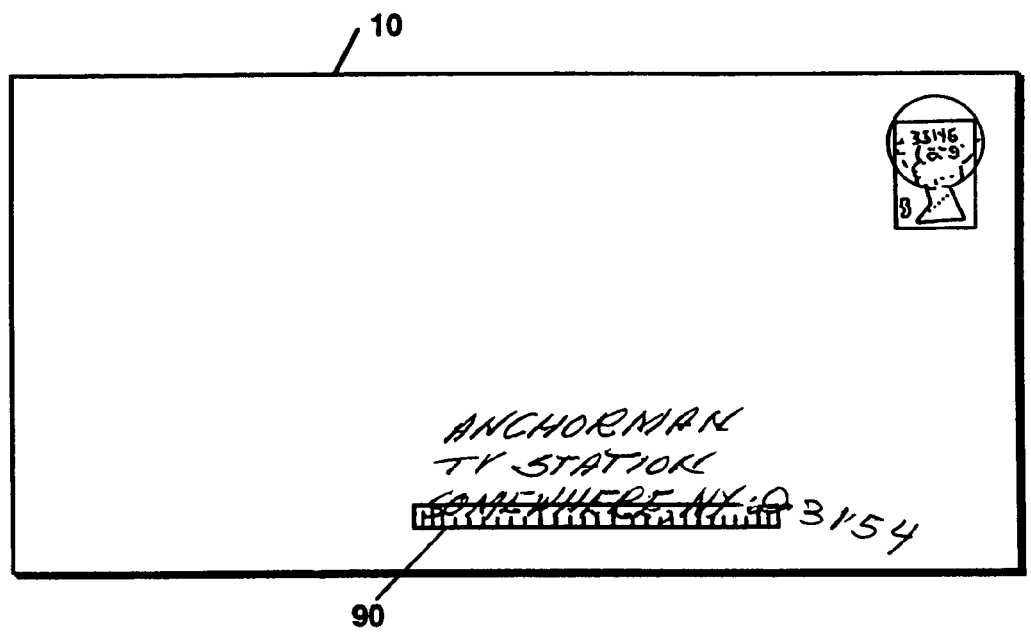
FIG. 2 depicts a graphical representation of a mail piece on which this invention is practiced.

As shown in FIG. 2, the characteristics of a high profile target, handwritten destination address, and lack of return address are discernible by image processing. The method and system of this invention enable the early detection by image analysis of combinations of characteristics consistent with threat mail, to the extent that further inspection or processing is warranted. There are a large number of characteristics consistent with threat mail that can be discerned from mail piece images. For many characteristics, the bi-tonal image of the front (postage side) of the envelope, received by remote image reading and processing system 2 (RCR), is adequate. Other mail piece characteristics such as specific stamp type identification would require grayscale imagery.

The presence of a single mail piece characteristic is in most cases insufficient to classify a mail piece as fitting a threat profile. (However, in some embodiments, one characteristic such as, but not limited to, a handwriting characteristic may suffice.) Specification and detection of combinations of individual characteristics, however, can be a powerful technique to isolate a subset of mail that is consistent with a threat profile, and therefore warrants time-consuming inspection or extensive special processing. The methods of this invention enable profiles to be defined and tested against each image processed by the remote image reading and processing system 2 (RCR). An example profile for handwritten mail without Return-Addresses could consist of the following combination of characteristics:

Profile 1:

Initiating P&DC: TRENTON, NJ

Destination Address: US SENATE

Destination-address style: HANDWRITTEN

Return-address style: NOT PRESENT

POSTNET bar code: NOT PRESENT

Envelope length: <7 INCHES

REJECT ENTRY CENTER (REC) SITE REVIEW

It should be noted that not every characteristic need be specified in the profile. For example, if a profile is silent regarding the presence, location or content of a POSTNET bar code, that characteristic can be ignored for that profile. In the method of this invention, multiple profiles may be defined and simultaneously active in the remote image reading and processing system (RCR) 2, with the set of characteristics for each image tested against each profile. When an image matches one or more of the profiles, the image and/or the mail piece are identified for special processing (step 80, FIG. 1) as discussed herein below.

In one embodiment, the profiles would be maintained in a Profiling Configuration File (database) on the remote image reading and processing (RCR) system 2, which is be created at and downloaded from an Image Inspection System Server 17. Performing Real Time Mail Image Profiling opens the possibility of taking immediate action for mail detected as threat-consistent early in the mail processing cycle. Several embodiments of actions that may occur in reaction to detection of a mail piece fitting a threat profile are described below. Actions range from simply logging the image (retaining a copy of the image within a file for later inspection) to affecting sorting before the mail piece leaves the originating facility (placing the mail piece out of the processing stream).

Figure 3:
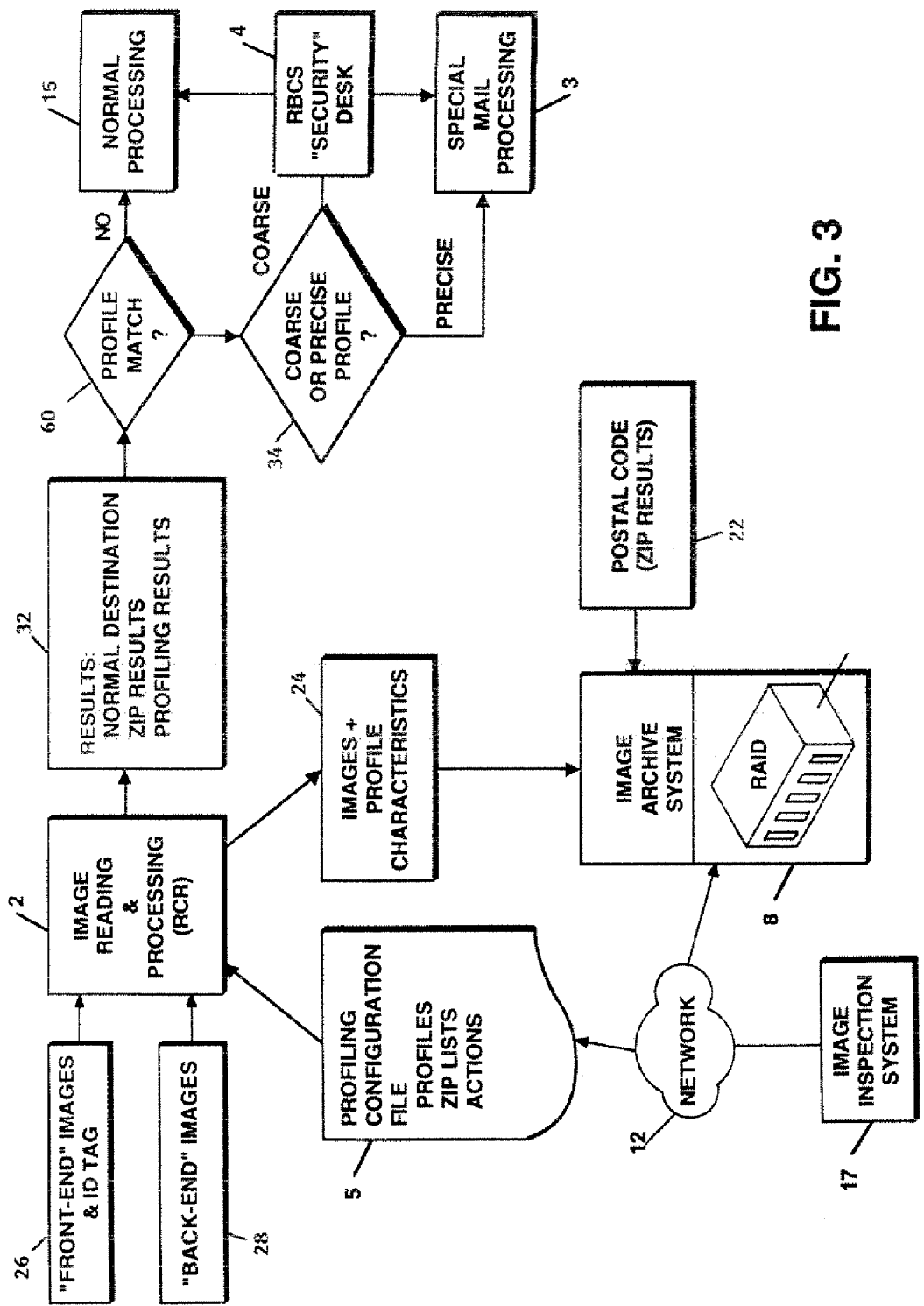
FIG. 3 depicts a schematic graphical representation of another embodiment of this invention.

In one embodiment, the remote image reading and processing (RCR) system 2 can perform "Front-end" and "Back-end" image processing (see FIG. 3). For "Front-end" processing, the remote image reading and processing system (RCR) 2 receives and analyzes an image while the mail piece is in flight on a mail transport (such as a MLOCR or DIOSS transport) (26, FIG. 3). The result message from the remote image reading and processing system (RCR) 2 is normally used to indicate the destination postal (ZIP) code result achieved by address recognition processing of the remote image reading and processing system (RCR) 2. In this embodiment, this result message may be modified or augmented to indicate that a mail piece fits a "Profile" as described earlier. This special result, which could take the form of a reserved postal (ZIP) code, could be used to sort the "Profiled" mail to special bins for subsequent special handling or manual inspection (3, FIG. 3). This approach is practical only for very accurate high-resolution profiles, such as detection of a letter form a specific return address. The approach is impractical for profiles based on characteristics that are coarse or subject to inaccuracies, as the volume of mail out-sorted for special handling may be too high. For profiles based on characteristics that are coarse or subject to inaccuracies, a preferred alternative involves routing the "Profiled" mail piece to "Back-end" processing at the remote image reading and processing system (RCR) 2, as discussed below.

In this embodiment, the "Back-end" processing at the remote image reading and processing system (RCR) 2 occurs while mail is in trays waiting for the next (in one embodiment, RBCS) processing step (28, FIG. 3). Normally, the result from "Back-end" processing is used to determine whether video coding of an image must occur to determine the destination result address. The video coding occurs at remote (REC) sites. As in the case of "Front-end" processing, the result record obtained from the remote image reading and processing system (RCR) may be modified to indicate that a mail piece fits a "Profile". For "Back-end" processing at the remote image reading and processing system (RCR), two scenarios for handling "Profiled" mail pieces may be implemented. Mail pieces fitting very accurate high-resolution profiles (again, the example of detecting a specific return address) could be flagged immediately as requiring manual inspection or neutralization. The mail pieces matching very accurate high-resolution profiles may be identified, through barcodes or other means, so that the mail pieces can be out-sorted for inspection (or neutralization) on its next transport pass (for example, on an OSS or DIOSS transport).

For coarse profiles (e.g., mail pieces without a return address) (34, FIG. 3) indication of a profile match at the remote image reading and processing system (RCR) 2 may cause the image to go to a remote (REC) site for manual image inspection (4, FIG. 3). Specifically, a special "Security Desk" at another remote (REC) site 4 could be created to screen images flagged by the remote image reading and processing system (RCR) 2 as fitting a profile. The specially trained individual screening the profiled images would have access to up-to-the minute investigative information allowing the image to be further classified as innocuous or suspicious enough to warrant physical inspection or neutralization of the mail piece. Images classified as innocuous would require no further address keying if the remote image reading and processing system (RCR) 2 had resolved the destination address.

"Back-end" processing is not subject to the stringent latency constraints (approximately 3 seconds in one embodiment) of "Front-end" processing. Mail piece characteristics requiring significant computational time to detect may be detectable with high accuracy only during "Back-end" processing. "Front-end" detection of such characteristics may be limited to a coarse determination that further processing is needed to screen the mail piece, causing the mail piece to undergo "Back-end" processing.

Other possible embodiments can include neutralization as part of the "Back-end" processing as well as more detailed analysis.

"Archival Mail image profiling" can, in one embodiment, be utilized in circumstances in which the detecting of a match to a threat profile can occur late in the mail processing cycle. Some of those circumstances include, but are not limited to, the following:

Detecting mail fitting a new threat profile. A new threat profile would be created, for example, when an incident occurs of delivery of a piece of mail containing a harmful chemical or biological agent. Archival profiling is appropriate in this situation to profile mail processed at the same facility (or facilities) as the specimen mail piece, to identify similar mail pieces.

Mail characteristics whose detection requires extensive computation time. Detection of some mail characteristics may require extensive processing power and time, to the extent that they are not normally active for Real Time Mail Image Profiling (that is, in one embodiment, not normally active within RCR). A possible example would be one or more Handwriting Matching algorithms (it is possible, for example, that a coarse Handwriting Matching algorithm could be active for Real Time Mail Image Profiling, but that a more accurate but time-consuming algorithm is executed later to reduce the number of false positive errors).

In an embodiment utilizing Archival Mail Image Profiling, the profiling activity is decoupled from and possibly distant in time from the mail delivery cycle.

The mail piece characteristics applicable to Archival Mail Image Profiling can be a superset of those characteristics used for Real Time Mail Image Profiling. That is, the characteristics can include all of those applicable to Real Time profiling plus others extracted on demand for purposes of Archival profiling. In another embodiment, the Archival Mail Image Profiling occurs after the Real time Image Profiling.

In that last embodiment, the processing could be delayed for particular mail pieces while the Archival Mail Image Profiling occurs.

Image-Detectable Mail Piece Characteristics

Table 1 lists several, but not limited to, mail piece characteristics that can be reasonably detected, in one embodiment, by image analysis, grouping them into phases for deployment based on development time required to implement them. FIG.

Figure 4:
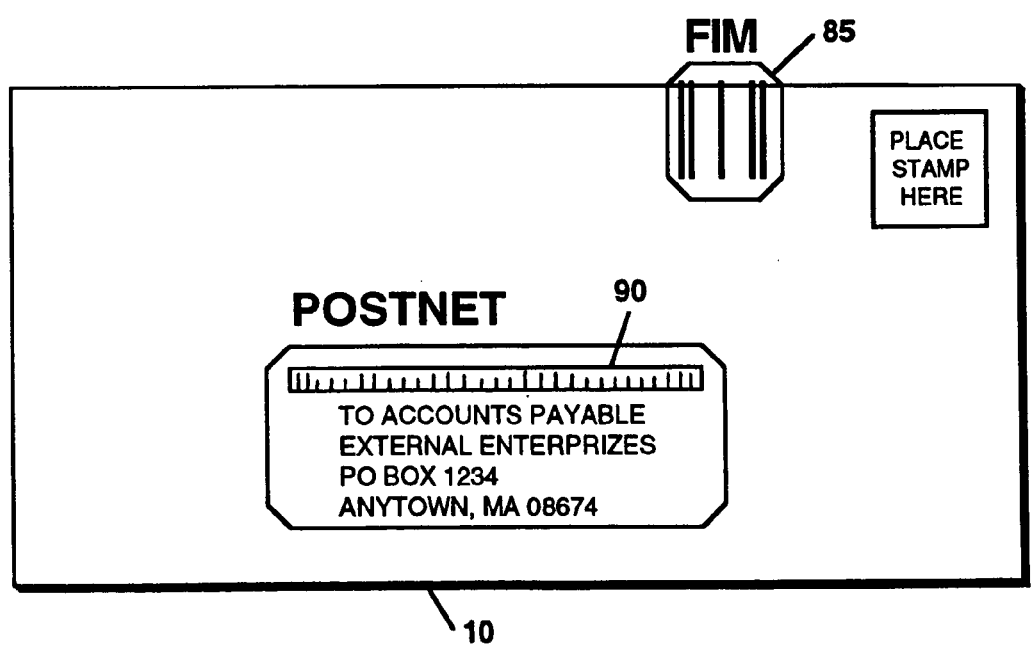
FIG. 4 depicts another graphical representation of a mail piece on which this invention is practiced.

4 depicts a mail piece and illustrates some of the characteristics detected, in this embodiment, by image analysis. A number of mail piece characteristics are detected as by-products of address recognition processing at the remote image reading and processing system (RCR), so are available for virtually immediate deployment, including:

- Destination address information: postal (ZIP) code, print style (Machine, Hand)
- Barcode information: presence and value of several barcodes of predetermined form (POSTNET and PLANET in one embodiment)
- facing identification marks
- Return Address postal code (ZIP) information
- Envelope size (See FIG. 4 for a graphical representation illustrating some of the characteristics of a mail piece.)

TABLE 1

Detectable image Characteristics List
Detectable Image Characteristics

Destination address Resolution
Barcodes (FIM, PLANET, POSTNET in one embodiment)
Return Address Determination
Envelope Size
Destination/Return Address Style
Clear Area Infringement
Destination Address Infringement
Stain
Postage Characteristics
Type
Excessive Postage
Restrictive Markings
Return address Resolution (including misspellings)
Envelope Characteristics
Handwriting Similarity Mail piece characteristic requiring more sophisticated algorithms for detection are grouped into later phases for deployment.

Exemplary, but not limited to, image-detectable mail piece characteristics, addressing degrees of effectiveness and accuracy, development time, image type, and relative processing power required, as described herein below.

Handwriting Matching, the capability to analyze handwriting or hand-printing on mail images to determine similarity to that of other (evidence) documents, is potentially a very valuable mail piece characteristic for Mail Image Profiling, and is treated separately herein below.

Several characteristics, but not limited to these, relevant to classifying a mail piece as threat-consistent from analysis of mail piece images are described below in terms of the differing degrees of effectiveness, accuracy, image type, and processing power required.

1) Barcodes (90, FIG. 5) and identifying marks (85, FIG. 5) (in one embodiment, FIM, POSTNET & PLANET). The remote image reading and processing system (RCR) 2 currently detects the presence of the four different facing identification mark 85 (FIM) types. This function is very accurate on most images, unless the mark (FIM) is obscured by stamps or cancellation marks. The barcodes 90 (POSTNET and PLANET) are effectively and accurately detected and decoded at the remote image reading and processing system (RCR) 2. The identifying marks 85 (FIM) and barcode 90 reading capabilities enable definition of mail profile characteristics (24, FIG. 3) based not only on presence or absence of these barcode types, but also on exact matches against specific values.

2) Destination Address Style. In one embodiment, the remote image reading and processing system (RCR) 2 detects multiple candidate address blocks (groupings of text that appear to have the form of a multi-line text address) on each letter image, and classifies each block as to the probability that it is a return or destination address. A byproduct of the optical character recognition (OCR) process on an address block is a coarse characterization of print style:

- V Machine Printed Styles—Sub-styles for Machine Print are Machine solid, Machine broken and Machine dot-matrix.
- Handwritten Styles—Sub-styles for handwritten are hand-printed and cursive. The categorization of sub-styles is more accurate for machine print addresses than for handwritten addresses.
- Skew—A coarse indication that pronounced skew of address text (where skew refers to a pronounced deviation from horizontal, i.e., from parallelism to the envelope bottom edge) exists may be obtained.

3) Destination Address Resolution. In one embodiment, the remote image reading and processing system (RCR) resolves the mail piece destination address from the envelope image, determining the finest-depth 11-digit postal (ZIP) code that corresponds to the address text. The remote image reading and processing system 2 (RCR) address resolution is performed in conjunction with address directory files created from previously obtained source data and refreshed weekly at each the remote image reading and processing system 2 (RCR) site, so the remote image reading and processing system 2 (RCR) address information is always up to date. A mail piece characteristic indicating that the destination address postal (ZIP) code resolved by the remote image reading and processing system (RCR) 2 matched any from a list of target postal codes (ZIPs) can be immediately provided. The matching process may support a wild card character (*) allowing a truncated comparison (e.g., for a 5-digit ZIP match).

4) Return Address Style. The classification of return address style at the remote image reading and processing system 2 (RCR) is similar to that described for destination address resolution.

5) Return Address Resolution. Return address resolution (including handwritten return address resolution) may support the following mail piece characteristics:

- Postal Code ZIP Match—against a list of postal codes (ZIP) (22, FIG. 3) in a configuration file, with wild-card support, allowing truncated comparison (e.g., for a 5-digit ZIP match).
- Invalid Return Address—indicating whether a match can be found in a postal code (ZIP+4) address database. The text return address block (as two separate characteristics). This indication is coarse, as false indications of an invalid address may be asserted due to incorrect OCR results.
- Invalid Deliver Point—indicating that while the text return address is consistent with the postal code (ZIP+4) address data, no match can be found in a more detailed address database. The data in the more detailed address database specifically identifies individual delivery points (e.g., each house on a street) rather than just a range of addresses as is contained in the postal code (ZIP+4) data. A randomly chosen house number for a valid street has a reasonable probability of being detected by this comparison.
- Non-local Return Address—Two embodiments of methods for providing a reliable indication as to whether the return address is not local (that is, is inconsistent with the collection point) are described below. These methods may be implemented at the remote image reading and processing system (RCR). A return address anomaly, such as a mail piece with a N.J. return address that was evidently Inserted into the mail stream in Florida, could be identified by one of the methods discussed below.

In one embodiment the consistency between the return address and the location of the mail processing transport that first processed the mail piece is examined. For each mail piece, the remote image reading and processing system (RCR) receives ID Tag information containing an identification number (ISS#, a number that uniquely identifies a specific MEOCR, DIOSS, or AFCS transport, throughout the nation) of the transport that first processed the mail piece. At the remote image reading and processing system (RCR) 2, the ID TAG ISS# is compared to a static table associating identification numbers (ISS#s) to the Sectional Center Facilities (identified, in one embodiment, by the first three digits of a postal (ZIP) code) served by the transports.

In a second embodiment, the consistency between the Return Address and the postmark on the mail piece is examined. The ID TAG comparison described above in the first embodiment utilizes existing information. Obtaining the information contained in the image of postmark on the mail piece requires additional image processing.

6) Envelope Size & Skew.

Envelope Size—At the remote image reading and processing system (RCR) 2, a "cropping" function detects the height of the mail piece in the image and excludes any overscan areas. Envelope length is detected directly by the number of scan lines contained in the image (nominally 212 scan lines per inch). In this embodiment, the envelope dimensions are used to characterize the envelope size (e.g., business envelope, personal envelope) or to support specific tests for envelope height and width. The camera scan height (approximately 4.5" for presently utilized cameras) limits the maximum range of envelope height detection.

Envelope Skew—Envelopes containing powder or other bulky contents may have a tendency to skew on the mail processing transports. In one embodiment, the skew is detected utilizing the bi-tonal image of the mail piece. In another embodiment, grayscale image processing may be used to detect envelope skew.

7) Postage characteristics. The following embodiments, but not limited to, can be used to identify postage characteristics:

Postage Type—A postage type classifier, based on neural net technology, may be integrated into the remote image reading and processing system (RCR) to distinguish the following postage types:
Stamp
Metered
Pre-printed
Embossed Effectiveness and accuracy may initially be limited to a coarse classification, with moderate accuracy, since the mail pieces whose images are captured on present mail processing transports have cancellation markings over the postage. Use of grayscale images would allow higher accuracy of classification.

Excessive Postage—The following embodiments but not limited to, can distinguish instances of probable excessive postage. An assessment of the extent and shape of the postage area may be obtained from image processing of the binary (bi-tonal) images Combined with the neural net technology described above for determining Postage Type, this method could assess the probability of presence of multiple stamps. The result is a probabilistic indication of excessive postage.

A more precise determination of the postage amount on an envelope requires processing grayscale images in order to recognize in detail specific stamp images and their amounts.

8) Restrictive Markings—The possible presence of restrictive text such as the words "Personal" or "Confidential" may be detected by means of image character recognition. In some embodiments, the image processing could be performed at the remote image reading and processing system (RCR) 2. For handwritten marks, the detection would require handwriting analysis and may be more appropriately performed offline. For machine printed mail, optical character recognition results, usually obtained at the remote image reading and processing system (RCR) 2, enable searching machine printed text for keywords (32, FIG. 3.

9) Clear Zone Infringements—Several embodiments, but not limited to, of methods for detecting Clear Zone Infringements are disclosed below. Referring to FIGS. 2 and 4, the bottom band of envelope images seen by the remote image reading and processing system (RCR) 2 is normally clear, as this is the area in which a (POSTNET) barcode 90 is printed after the remote image reading and processing (and video coding if applicable) is completed. Different infringements to the clear area could be detected in both binary and gray images by the methods described herein below.

Destination Address Infriement—Referring to FIG. 2 the letter 10 exhibits a handwritten address block that infringes on the clear zone at the bottom of the envelope and on the barcode 90. The coordinates of a bounding box for each candidate address block found in the image are obtained by image processing. Infringement of the address block on the clear zone can also be detected by image analysis.

Stain. Stains from settling of chemical compounds may be visible as noise in the bi-tonal image of the front of the envelope used for optical character recognition (OCR) processing. The image of the mail item, and in particular the bottom of the image (bottom of the envelope), may be analyzed by means of image processing techniques in order to classify the area as "Not Clear", possibly indicative of a stain. More definitive analysis may be performed on gray images. In one embodiment, the analysis may be performed at the remote image reading and processing system (RCR) 2.

Handwriting Matching—Handwriting analysis may be utilized to compare handwriting on images of mail to one or more reference images of evidence documents. The result of this comparison can produce a similarity score that could be thresholded to identify mail pieces that may have been penned by the author of the evidence mail piece.

TABLE 2

Image-Detectable Mail Piece Characteristics

| Characteristic | Categories | Image Type | Detection Rate | Accuracy |
|---|---|---|---|---|
| 1) FIM, POSTNET, & PLANET Barcodes | FIM presence & type Barcode type Barcode field | Bi-Tonal | High | High |

TABLE 2-continued

Image-Detectable Mail Piece Characteristics

| Characteristic | Categories | Image Type | Detection Rate | Accuracy |
|---|---|---|---|---|
| | match (against list) | | | |
| 2) Destination-Address Style | Handwritten (any form) | Bi-Tonal | Moderate | Moderate |
| | Hand printed Hand cursive | Bi-Tonal | Moderate | Moderate |
| | Machine printed (any form) | Bi-Tonal | Moderate | Moderate |
| | Machine solid Machine broken Machine dot-matrix | Bi-Tonal | Moderate | Moderate |
| 3) Destination Address Resolution | Zip Match (against a List of ZIPS) | Bi-Tonal | High | High |
| | Mis-spelled words (MP) | Bi-Tonal | Low | Moderate |
| 4) Return-Address Style | Not present | Bi-Tonal | Moderate | Moderate |
| | Handwritten (any form) | Bi-Tonal | Moderate | Moderate |
| | Hand printed Hand cursive | Bi-Tonal | Moderate | Moderate |
| | Machine printed (any form) | Bi-Tonal | Moderate | Moderate |
| | Machine solid Machine broken Machine dot-matrix | Bi-Tonal | Moderate | Moderate |
| 5) Return Address Resolution | Invalid address (ZIP+4 Directory) | Bi-Tonal | Moderate | Moderate |
| | Invalid address (DPF Directory) | Bi-Tonal | High | High |
| | Non-local return address | Bi-Tonal | Low (HW) Moderate (MP) | Moderate (HW) High (MP) |
| | | Bi-Tonal | High | High |
| | Postal Code (Zip) Match (against a list of ZIPS) | Bi-Tonal | Low (HW)-5 digits Moderate (MP) to High - 11 digits | High |
| 6) Envelope Size & Skew | Envelope Length Envelope Height | Bi-Tonal | High | High |
| | Envelope Skew | Bi-Tonal | Moderate | Moderate |
| 7) Postage Characteristics | Postage Type (Stamp, Metered, Pre-printed, Embossed) | Gray | Moderate | Moderate |
| | Excessive Postage | Bi-Tonal | Moderate | Moderate |
| | | Gray | High | High |
| 8) Restrictive Markings | Configurable list of keywords ("Personal", "Confidential", etc.) | Bi-Tonal | Low (HW) Moderate (MP) | Moderate (HW) High (MP) |
| 9) Clear Area Infringement | Destination Address Infringement | Gray | Moderate | Low |
| | Stain | Bi-Tonal | Low | Low |
| | | Gray | Moderate | Moderate |
| 10) Handwriting Matching | Similarity score (degree of similarity to image of evidence mail) | | | |

Table Legend:
Image Type: Type of image required to support detection of the image characteristic:

| Bi-tonal: | Current bi-tonal images of the front of the envelope are usable |
| Gray: | Grayscale images required |
| Color: | Color images required |

Detection Rate: An estimate of the frequency of false negatives—instances where a mail piece exhibits the characteristic but the system fails to detect and indicate it:

| Low | UP to 25% false negatives |
| Moderate | Up to 15% false negatives |
| High | Up to 5% false negatives |
| Very High | Approximately 1%-2% false negatives |

Accuracy: An estimate of the frequency of false positives—instances where the system incorrectly indicates that the characteristic is exhibited by the mail piece

| Low: | Up to 25% false positives |
| Moderate: | Up to 5% false positives |
| High: | Approximately 1%-2% false positives |

Handwriting Matching

The term "Handwriting Matching" is used here to describe a capability to compare characteristics of handwriting or hand-printing from mail piece images to characteristics obtained from evidence documents, to determine (with a quantified confidence level) whether they were penned by the same author.

Handwriting Matching is a potentially valuable technology to apply within the previously described Mail Image Profiling framework, with possible use for both Real time and Archival profiling. The confidence output from a Handwriting Matching algorithm can be assigned as a mail piece characteristic, and thresholded to determine if the mail piece meets the requirements of a specific profile.

While handwriting recognition (as performed in support of address recognition in the remote image reading and processing system (RCR) system 2) has different goals than handwriting matching (determining whether documents come from the same author), many of the underlying technical principles and image analysis techniques apply to both. Examples of technology available in address recognition and Handwriting Matching technology are described herinbelow.

Numerous handwriting features and attributes have been explored for applicability to identification and profiling through sampling (see, for example, S. N. Srihari and S. Lee, *Automatic Handwriting recognition and Writer Matching on Anthrax-related Handwritten Mail*, Proc. of the 8th Int'l Workshop on Frontiers in Handwriting Recognition, 2002). Computer enabled methods, which are able to locate character strings within handwritten documents, have been developed. These methods could be modified to assist in handwriting matching (see, for example, *Recognizing the Truth About Character Recognition*, Jim Terry, Stacy Kamigaki, Tatyana Vazulina, May 19, 2000, available at http://www.parascript.com/products/whitepapers.cfm).

Figure 5:
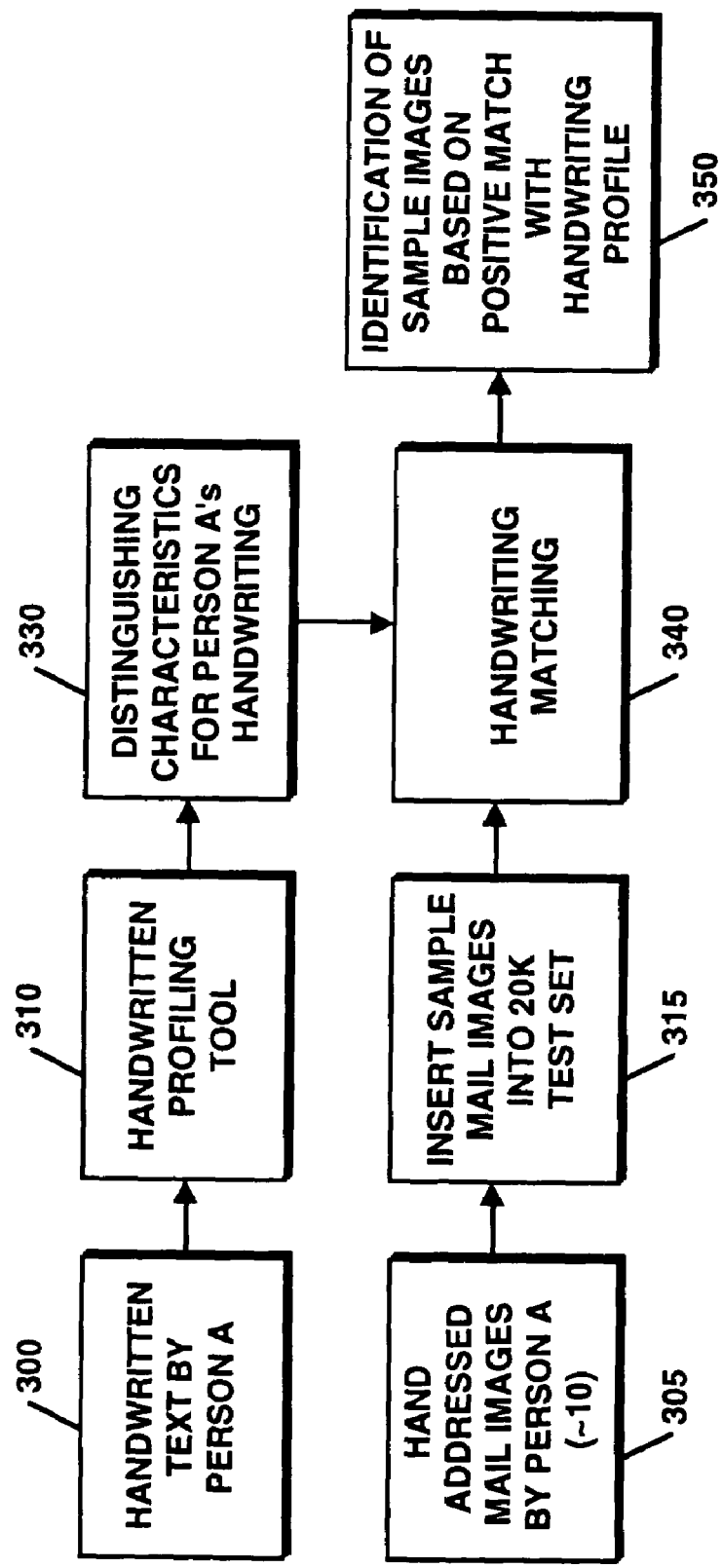
FIG. 5 depicts a flow chart of an embodiment of another method of this invention.

FIG. 5 indicates an embodiment in which the Handwriting Matching software is utilized to pre-process samples of a person's handwriting to extract distinguishing characteristics, then is utilized to identify other mail pieces penned by the same individual. Referring to FIG. 5, a handwriting sample 300 from one individual is processed by means of a handwriting profiling method 310 and the distinguishing handwriting characteristics for that individual 320 are included in the profile. A hand addressed mail piece is imaged and the image 305 and the handwriting characteristics are obtained for that image 315. The handwriting characteristics are obtained for that image 315 are compared to the distinguishing handwriting characteristics for that individual 320 and mail piece is identified for special processing 350, if the distinguishing handwriting characteristics for that individual 330 substantially match 340 the handwriting characteristics are obtained for that image 315.

System

Figure 6:
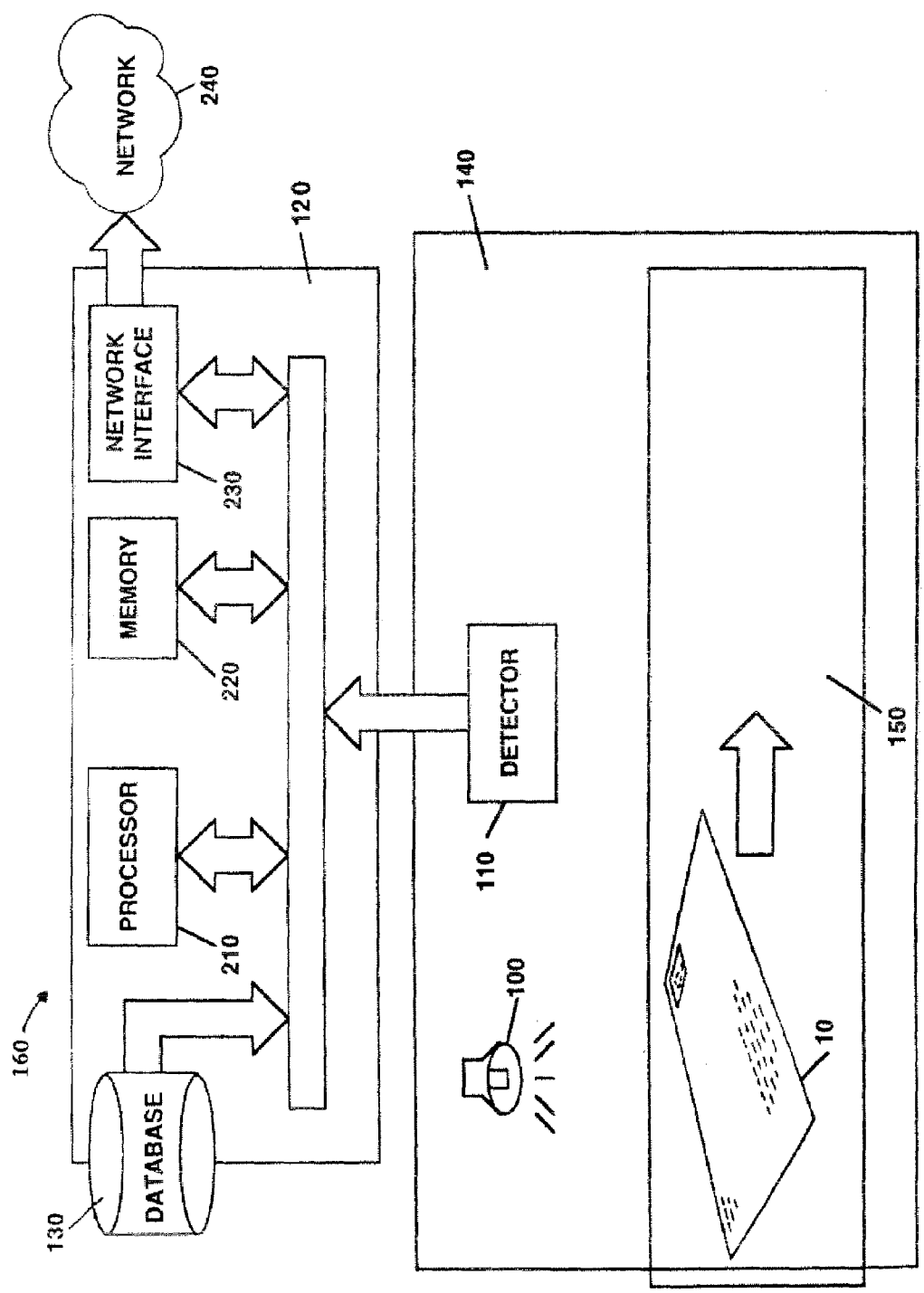
FIG. 6 depicts a block diagram representation of an embodiment of a system of this invention.

FIG. 6 depicts a block diagram representation of an embodiment of a system of this invention. Referring to FIG. 6, system 160 includes a transport sub-system 140 (such as in an AFCS, MLOCR, or DIOSS transport) and a computing sub-system 120. The system 160 includes both the transport and the remote image reading and processing system (RCR) 2. Transport sub-system 140 includes a transport, conveyor or pinch belt 150, a radiation source 100, a detector 110 and any optical elements necessary to produce a scanned image of mail piece 10 utilizing detector 110. The detector 110 (including any optical elements necessary to produce a scanned image of mail piece 10) constitute means for obtaining an image of the mail piece (item) 10. The detector 110 may be, but is not limited to, a digital acquisition device, a video camera, or a detector such as a CMOS or CCD image detector. Computing sub-system 120 includes one or more processors 210, computer readable media (one or more memories) 220, network interface 230 and database 130. The computer readable media (one or more memories) 220 has computer readable code embodied therein which causes the one or more processors 210 to execute methods that process images of the mail piece 10 for the purpose of address resolution, reading address text and deriving delivery point ZIP codes, obtain image characteristics for the mail piece 10, retrieve a threat (predetermined) profile, compare the image characteristics to the threat profile, if the image characteristics match the threat profile, identify the mail piece (and image) for special processing. The computer readable code that causes the one or more processors 210 to execute methods that process images of the mail piece 10 for the purpose of address resolution, reading address text and deriving delivery point ZIP codes, obtain image characteristics for the mail piece 10 constitute means for obtaining image characteristics for the image of the mail piece 10 (item). The computer readable code also causes the one or more processors 210 to, if the image characteristics do not match the threat profile, retrieve another profile and repeat the comparison step, and, if the image characteristics do not match any one threat profile, continue normal mail processing. The threat profile can reside in the computer readable media (one or more memories) 220 or in database 130. Also, scanned images of mail pieces and their corresponding image characteristics can be stored in the computer readable media (one or more memories) 220 or in database 130. Threat profiles can be obtained via a network 240 through a network interface 230 from a server 260, where, in one embodiment, the profiles are stored, (FIG. 7).

In one embodiment, the database 130 stores data for the threat profiles after receiving the profiles via the network 240. (In another embodiment, the profiles reside at the database 130.) The data corresponding to one profile includes an identifier for the profile, data for image characteristics present in the profile, and an action identifier.

Figure 7:
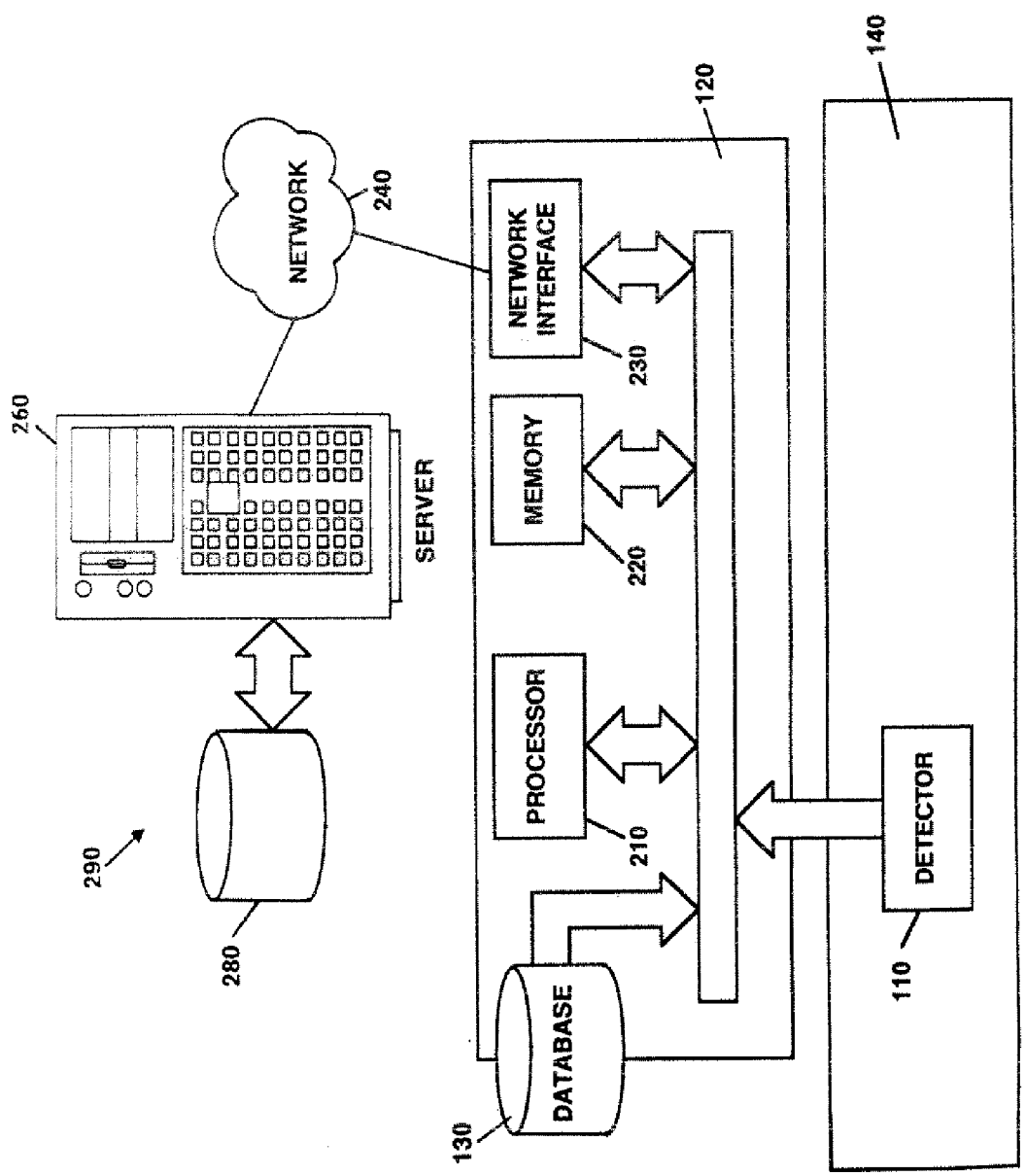
FIG. 7 depicts a block diagram representation of another embodiment of a system of this invention.

FIG. 7 depicts a block diagram representation of another embodiment of a system of this invention. Referring to FIG. 7, system 290 includes transport sub-system 140, computing sub-system 120, network 140, server 260 and server database 280. Transport sub-system 140 and computing sub-system 120 operate as described above. Server 260 and server database 280 can be utilized to store and provide threat profiles, as also described above. Server 260 and server database 280 can also be utilized in "offline" mail image profiling.

In one embodiment of "offline" mail image profiling, the comparison of the image characteristics to the threat profile requires extensive computations, as in the case of handwriting analysis. Server 260 includes one or more processors (not shown), computer readable media such as one or more memories (also not shown). The computer readable media (one or more memories) in sever 260 has computer readable code embodied therein which causes the one or more processors in server 260 to execute methods that obtain image characteristics for a scanned image of a mail piece, retrieve a threat profile, perform extensive calculations needed to compare the image characteristics to the threat profile, compare the image characteristics to the threat profile, and, if the image characteristics match the threat profile, identify the image for special processing. The computer readable code, in server 260, also causes the one or more processors in server 260 to, if the image characteristics do not match the threat profile, retrieve another profile and repeat the comparison step. The threat profiles are, in one embodiment, stored in the server database 280. In another embodiment, the threat profiles are stored in the database 130. The scanned image of the mail piece can reside in the server database 280 or in database 130. If the scanned image of the mail piece resides in database 130, it can be provided to server 260 via network 240.

It should be noted that, in one embodiment, a subset of the methods for comparing the image characteristics to the threat profile can be performed utilizing the one or more processors 210 in computing sub-system 120. In that embodiment, the remainder of the subset including the extensive computations is performed utilizing the one or more processors in server 260. Server 260 provides an execution platform for performing image analysis to extract mail piece characteristics not normally provided by Real Time Mail Image Profiling (i.e., not provided by the remote image reading and processing system (RCR)). An example, again, could be a high-precision Handwriting Matching algorithm.

In general, the techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to data entered using the input device to perform the functions described and to generate output information. The output information may be applied to one or more output devices.

It should be noted that, the term "mail piece" includes any item, envelope or package being delivered a package delivery service.

Elements and components described herein may be further divided into additional components or joined together to form fewer components for performing the same functions.

Each computer program may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable (computer usable) media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, such as electromagnetic radiation or electrical signals, or any other medium from which a computer can read.

Although the invention has been described with respect to various embodiments, it should be realized that this invention is also capable of a wide variety of further and other embodiments all within the spirit and scope of the appended claims.

What is claimed is:

1. A method for identifying mail pieces having postage sides for special processing based upon a plurality of predetermined profiles, the method comprising the steps of:
   a) selecting a combination of values for individual profile image characteristics to create each one of the plurality of predetermined profiles, the values being chosen such that the combination is consistent with threat mail, the individual profile image characteristics being associated with various locations on the postage side of the mail piece;
   b) storing the plurality of predetermined profiles, each of the predetermined profiles having values for the plurality of selected profile image characteristics;
   c) obtaining mail piece image characteristics associated with an image of a mail piece;
   d) retrieving one of the plurality of predetermined profiles that has not yet been used in a comparison;
   e) comparing the mail piece image characteristics to the one of the plurality of predetermined profiles;
   f) identifying the mail piece for special processing, if the one of the plurality of predetermined profiles substantially matches the mail piece image characteristics; and
   g) repeating steps d) through f) for another one of the plurality of predetermined profiles, if the one of the plurality of predetermined profiles does not substantially match the mail piece image characteristics.

2. The method of claim 1 wherein the step of comparing the mail piece image characteristics to the one of the plurality of predetermined profiles occurs during real-time processing.

3. The method of claim 1 wherein the step of comparing the mail piece image characteristics to the one of the plurality of predetermined profiles occurs during offline processing.

4. The method of claim 1 wherein the profile image characteristics are selected from the group consisting of barcodes, address styles, address resolution, envelope size, initiating processing and distribution center, addressee, postage characteristics, markings, and handwriting characteristics.

5. The method of claim 1 wherein said step of comparing can be executed with a subset of the plurality of the predetermined profiles simultaneously, and wherein said step of identifying the mail piece for special processing can result from a match from any one of the plurality of the predetermined profiles.

6. The method of claim 1 further comprising the steps of:
   modifying a result record associated with the image of the mail piece if the mail piece is flagged for the special processing;
   transmitting the image to a remote site for manual image inspection according to the result record; and
   classifying the mail piece based on the manual image inspection.

7. The method of claim 1 further comprising the steps of:
   h) archiving the mail image having archived mail piece image characteristics;
   i) updating the plurality of predetermined profiles by creating at least one new predetermined profile having a plurality of selected new profile image characteristics;
   j) retrieving one of the new predetermined profiles that has not yet been used in the comparison;
   k) comparing the archived mail piece image characteristics to the at least one new predetermined profile;
   l) identifying the archived mail piece for the special processing, if the new predetermined profile substantially matches the archived mail piece image characteristics; and
   m) repeating steps (i) through (l) for another one of the new predetermined profiles, if the new predetermined profile does not substantially matches the archived mail piece image characteristics.

8. A system enabling identification of mail pieces based upon predetermined profiles, the system comprising:
   a detector and optical elements configured to obtain an image of a mail piece;
   at least one processor configured to obtain mail piece image characteristics associated with the image of the mail piece;
   at least one computer readable memory having:
   (a) a database storing data for each one of a plurality of predetermined profiles, the data comprising:
      a profile identifier,
      a plurality of profile image characteristics and associated values, the values being chosen such that the plurality of profile image characteristics is consistent with threat mail, the profile image characteristics being associated with various locations on the postage side of the mail piece, and
      an action identifier configured to specify a plurality of actions associated with the profile identified by the profile identifier; and,
   (b) computer readable code embodied in the at least one computer readable memory the computer readable code configured to cause the at least one processor to:
      (i) retrieve the data for one of the plurality of predetermined profiles from the database,
      (ii) compare the mail piece image characteristics to the one of the plurality of predetermined profiles from the retrieved data,
      (iii) identify the mail piece as requiring one of the plurality of actions identified by the action identifier from the retrieved data, if the mail piece image characteristics present in the retrieved data substantially match the one of the plurality of predetermined profiles from the retrieved data,
      (iv) repeat steps i) through iii) for another one of the plurality of predetermined profiles, if the one of the plurality of predetermined profiles does not substantially match the mail piece image characteristics.

9. The system of claim 8 further comprising:
a network interface and a server configured to communicate with a network.

10. The system of claim 9 further comprising:
a remote server configured to receive and send the data.

11. The system of claim 9 wherein said database is downloaded from the network.

12. The system of claim 8 wherein the profile image characteristics are selected from the group consisting of barcodes, address styles, address resolution, envelope size, initiating processing and distribution center, addressee, postage characteristics, markings, and handwriting characteristics.

13. The system of claim 8 wherein said computer readable code is further configured to compare the mail piece image characteristics with a subset of the plurality of the predetermined profiles simultaneously, and wherein said computer readable code is further configured to identify the mail piece for special processing if there is a match from any one of the plurality of the predetermined profiles.

14. A system enabling identification of mail pieces based upon predetermined profiles, the system comprising:
a detector and optical elements configured to obtain an image of a mail piece;
at least one processor configured to obtain mail piece image characteristics associated with the image of the mail piece;
a first computer readable memory for storing data for access by a process executed by at least one processor, said memory comprising:
a database storing data for each one of a plurality of predetermined profiles, the data comprising:
a profile identifier,
values for a plurality of selected profile image characteristics, the values being chosen such that the plurality of selected profile image characteristics is consistent with threat mail, the plurality of selected profile image characteristics being associated with various locations on the postage side of the mail piece, and
an action identifier configured to specify a plurality of actions associated with the profile identified by the profile identifier;
at least one second computer readable memory having computer readable code embodied therein, the computer readable code configured to cause the at least one processor to:
(a) retrieve the data for one of the plurality of predetermined profiles from the database,
(b) compare the mail piece image characteristics to the one of the plurality of predetermined profiles from the retrieved data,
(c) identify the mail piece as requiring one of the plurality of actions identified by the action identifier from the retrieved data, if the mail piece image characteristics present in the retrieved data substantially match the one of the plurality of predetermined profiles from the retrieved data, and
(d) repeat steps a) through c) for another one of the plurality of predetermined profiles, if the one of the plurality of predetermined profiles does not substantially match the mail piece image characteristics.

15. The system of claim 14 further comprising:
a network interface and a server configured to communicate with a network.

16. The system of claim 15 further comprising:
a remote server configured to receive and send the data.

17. The system of claim 14 wherein each of the profile image characteristics is selected from the group consisting of barcodes, address styles, address resolution, envelope size, initiating processing and distribution center, addressee, postage characteristics, markings, and handwriting characteristics.

18. The system of claim 16 wherein the remote server includes:
at least one third memory having computer readable code embodied therein, the computer readable code configured to cause the at least one processor to:
retrieve the data for one of the plurality of predetermined profiles from the database,
compare the mail piece image characteristics for the image of the mail piece to the values for one of the plurality of predetermined profiles from the retrieved data, and
identify the mail piece as requiring one of the plurality of actions identified by the action identifier from the retrieved data, if the one of the plurality of predetermined profiles from the retrieved data substantially matches the mail piece image characteristics for the image of the mail piece.

19. The system of claim 18 wherein the computer readable code is further configured to cause the at least one processor to:
retrieve further data corresponding to another predetermined profile from the plurality of predetermined profiles from the database,
compare the mail piece image characteristics for the image of the mail piece to the one of the plurality of predetermined profiles from the retrieved further data, and
identify the mail piece as requiring one of the plurality of actions identified by the action identifier from the retrieved further data, if the one of the plurality of predetermined profiles from the retrieved data substantially matches the mail piece image characteristics for the image of the mail piece.

20. The system of claim 16 further comprising:
another memory for storing the data for access by a process executed by the remote server, said memory including a database.

21. The system of claim 14 wherein said computer readable code is further configured to compare the mail piece image characteristics with a subset of the plurality of the predetermined profiles simultaneously, and wherein said computer readable code is further configured to identify the mail piece for special processing if there is a match from any one of the plurality of the predetermined profiles.

22. A system for processing mail items and identifying mail items for special processing comprising:
a transport sub-system configured to transport a mail item;
an imaging sub-system configured to obtain an image of the mail piece;
a database configured to store a plurality of predetermined profiles, each of the plurality of predetermined profiles having a plurality of selected profile image characteristics, the database including a combination of values for the selected profile image characteristics, the values being chosen such that the combination is consistent with threat mail, the selected profile image characteristics being associated with various locations on the postage side of the mail piece;
a detector and optical elements configured to obtain mail piece image characteristics associated with an image of the mail piece;
a first computer readable code embodied in computer readable memory configured to retrieve one of the plurality of predetermined profiles, a second computer readable code embodied in computer readable memory configured to compare the mail piece image characteristics to one of the plurality of predetermined profiles until a match is found, if any; and a third computer readable code embodied in computer readable memory configured to identify the mail piece for special processing, if the one of the plurality predetermined profiles substantially matches the mail piece image characteristics for the image of the mail piece; and a fourth computer readable code embodied in computer readable memory configured to repeatedly execute said first computer readable code, said second computer readable code, and said third computer readable code for another one of the plurality of predetermined profiles, if the one of the plurality of predetermined profiles does not substantially match the mail piece image characteristics.

23. The system of claim 22 further comprising:
computer readable code configured to identify the mail piece as requiring one of a plurality of actions identified by an action identifier from the retrieved other of the predetermined profiles, if the one of the plurality of predetermined profiles from the retrieved data substantially matches the mail piece image characteristics for the image of the mail piece.

24. The system of claim 22 wherein the profile image characteristics are selected from the group consisting of barcodes, address styles, address resolution, envelope size, initiating processing and distribution center, addressee, postage characteristics, markings, and handwriting characteristics.

25. The system of claim 22 further comprising:
a network interface and a server configured to communicate with a network.

26. The system of claim 25 further comprising:
a remote server configured to receive and send the data.

27. The system of claim 22 wherein said computer readable code is further configured to compare the mail piece image characteristics with the combinations of values from more than one of the plurality of the predetermined profiles simultaneously, and wherein said computer readable code is further configured to identify the mail piece for special processing if there is a match from any one of the plurality of the predetermined profiles.

* * * * *